United States Patent Office 3,549,603
Patented Dec. 22, 1970

3,549,603
PROCESS FOR THE POLYMERIZATION OF AROMATIC POLYBENZIMIDAZOLES
Edward C. Chenevey, North Plainfield, and Anthony B. Conciatori, Chatham, N.J., assignors to Celanese Corporation, New York, N.Y., a corporation of Delaware
No Drawing. Continuation-in-part of application Ser. No. 517,854, Dec. 30, 1965. This application July 9, 1968, Ser. No. 743,314
Int. Cl. C08g 20/20, 20/42
U.S. Cl. 260—78.4               7 Claims

ABSTRACT OF THE DISCLOSURE

Aromatic polybenzimidazoles are prepared by continuously passing nitrogen through the polymerization reaction zone while maintaining the pressure therein at least equal to atmospheric pressure.

RELATED APPLICATIONS

This application is a continuation-in-part of application Ser. No. 517,854, filed Dec. 30, 1965 now abandoned, which is assigned to the assignee of the present invention.

BACKGROUND OF THE INVENTION

The present invention relates to a process for the preparation of aromatic polybenzimidazoles, and more particularly, to an improved process for the preparation of aromatic polybenzimidazoles wherein nitrogen is continuously passed through the polymerization reaction zone and the pressure therein is at least equal to atmospheric pressure.

Polybenzimidazoles, particularly aromatic polybenzimidazoles, are characterized by a high degree of thermal stability. They may be shaped to form fibers, films and other articles of wide utility which show great resistance to degradation by heat, hydrolytic media and oxidizing media. As described in United States Pat. No. 3,174,947; Reissue Patent No. 26,065; and in Vogel et al., Journal of Polymer Science, volume 50, pages 511–539 (1961), the aromatic polybenzimidazoles may be prepared by a two-stage, reduced pressure process. The monomer, in the case of a self-condensing trifunctional material, or monomers are subjected to a first stage, melt polymerization reaction. Generally, an initial temperature of about 200° C. and a pressure of less than about 0.5 mm. is used, with the temperature being raised gradually to about 300° C. over a half-hour period or longer. After formation of a foamed melt polymerized prepolymer in the first stage, a final product of particularly high molecular weight is formed by pulverizing the prepolymer and then subjecting the resulting powder to a second stage, solid state powder polymerization reaction. Generally, the second stage is conducted at temperatures above about 250° C., preferably of at least about 350° C., under a pressure no greater than about 0.7 mm. for a period of several hours or more.

It has been found that an excessive amount of insoluble polymer species, namely, gels and insolubles, are formed during the polymerization of the aromatic PBIs by such a two-stage reduced pressure process. The presence of the gels and insolubles is determined when the polymer is dissolved in a suitable solvent, for example, to form a spinning or casting dope or solution which is to be used to form filaments or films, respectively. Insolubles, as the term indicates, are the portions of the polymer which remain in their original form after attempted solutioning, that is, as granular polymer particles. Gels are highly swollen polymer structures having a fluffy gelatinous appearance and are often transparent in the polymer solution.

The presence of these insoluble species in the spinning or casting dope interferes with the continuity of the spinning or casting process and also adversely affects the homogeneity of the formed fiber or film. As a result, expensive and time consuming filtration steps are employed to remove the gels and insolubles from the polymer solutions or dopes prior to their use in spinning or casting operations.

SUMMARY OF THE INVENTION

Accordingly, the primary object of the present invention is to provide an improved process for the polymerization of aromatic polybenzimidazoles. Another object is to provide a process for the preparation of aromatic polybenzimidazoles such that a polymer solution formed from the resulting polymer product will contain less insoluble species, that is, gels and insolubles, than a solution formed from the corresponding polymer product produced by the prior art two-stage reduced pressure process. These and other objects will be apparent from the following description.

In accordance with the present invention, aromatic polybenzimidazoles are prepared in a polymerization reaction zone maintained under substantially oxygen-free conditions and at a temperature above about 200° C. by continuously passing nitrogen through the reaction zone and maintaining the pressure therein at least equal to atmospheric pressure.

The essence of the present invention is the discovery that the polymerization reaction can be conducted at atmospheric pressure or higher provided nitrogen is continuously passed through the reaction zone during the polymerization reaction to yield a polymer product having a substantially lower gel and insoluble content than the corresponding polymer produced by the two-stage reduced pressure process.

The gel and insoluble content of a polymer, or in other words, the amount of insoluble species that is present in solution when the polymer is dissolved in a suitable solvent may be quantitatively expressed in terms of the polymer "plugging value." The plugging value represents the weight of polymer which can be filtered per unit area under specified conditions in infinite time. As used herein, the plugging value is determined by initially forming a 7% by weight solution of the PBI polymer in concentrated sulfuric acid (96–98% sulfuric), and then filtering the solution at 25° C. and one atmosphere pressure through a Gelman Type A glass paper filter. The plugging value which is the number of grams of polymer solution filtered is expressed in grams of polymer per square centimeter. A higher value indicates a polymer solution containing less gels and insolubles.

DETAILED DESCRIPTION OF THE INVENTION

Aromatic polybenzimidazoles are a known class of heterocyclic polymers, which consist essentially of recurring units of the following Formulas I and II. Formula I is:

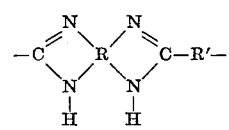

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aromatic ring and a heterocyclic ring such as pyridine, pyrazine, furan, quinoline, thiophene, and pyran.

Formula II is:

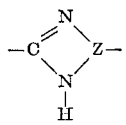

wherein Z is an aromatic nucleus having the nitrogen atoms forming the benzimidazole ring paired upon adjacent carbon atoms of the aromatic nucleus.

Any of the above aromatic PBIs represented by the Formulas I and II may be prepared according to the process of the present invention.

As set forth in United States Pat. No. 3,174,947 and Reissue Patent 26,065, which are incorporated herein by reference, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substitutent. Exemplary of polymers of this type is poly-2,5(6)-benzimidazole prepared by the auto-condensation of phenyl-3,4-diaminobenzoate.

As also set forth in the above-mentioned patents, the aromatic polybenzimidazoles having the recurring units of Formula I may be prepared by condensing an aromatic tetraamine compound containing a pair of orthodiamino substituents on the aormatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

The following generalized equation illustrates the condensation reaction which occurs in forming the polybenzimidazoles having the recurring units of Formula I (R and R' are aromatic):

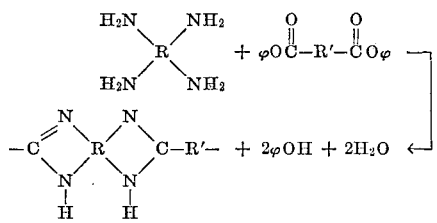

Suitable R aromatic radicals are a single aromatic ring such as

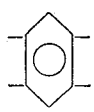

1,2,4,5-phenylene; a polynuclear fused aromatic ring such as

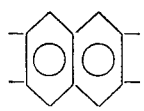

2,3,6,7-napthylene; and a polynuclear aromatic ring such as

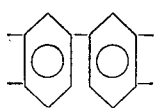

3,3',4,4'-biphenylene or

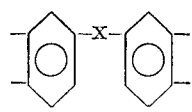

wherein X is

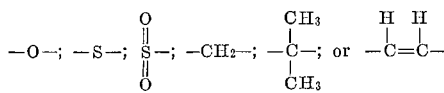

The aromatic R' (divalent) radical may also be a single aromatic ring; fused polynuclear aromatic rings; or polynuclear aromatic rings such as described above with respect to the tetraamine derived (tetravalent) R radical.

These R' aromatic compounds, which are derived from corresponding diphenyl esters of aromatic dicarboxylic acids or anhydrides of the acids, and the tetraamines may be further substituted with small nonreactive substituents on the aromatic nuclei. Thus, the aromatic nuclei may additionally bear lower alkyl groups as methyl or ethyl substituents, lower alkoxy groups as methoxy or ethoxy substituents or other similar small substituents which are not capable of reaction, under the conditions of condensation with the ortho diamino reactive centers or with the carboxylic acid reactive centers. Mixtures of the various tetraamines and dicarboxyl compounds may be used to form copolymers.

Examples of polybenzimidazoles which have the recurring structure of Formula I and which may be prepared according to the process of the present invention include:

poly-2,2'(m-phenylene)5,5'-bibenzimidazole;
poly-2,2'-(pyridylene-3'',5'')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(biphenylene-4'',4''')-5,5'-bibenzimidazole;
poly-2,6-(m-phenylene)-diimidazobenzene;
poly-2,2'(m-phenylene)-5,5'-di(benzimidazole)ether;
poly-2,2'(m-phenylene-5,5'-di(benzimidazole)sulfide;
poly-2,2'(m-phenylene)-5,5'-di(benzimidazole)sulfone;
poly-2,2'(m-phenylene)-5,5'-di(benzimidazole) methane;
poly-2',2''(m-phenylene)-5',5''-di(benzimidazole)propane-2,2; and
poly-2',2''(m-phenylene)-5',5''-di(benzimidazole) ethylene-1,2 where the double bonds of the ethylene groups are intact in the final polymer.

Preferably, equimolar quantities of the monomeric tetraamine and dicarboxyl compound are introduced into a first stage melt polymerization reaction zone and heated therein at a temperature above about 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer is formed. Usually, the first stage reaction is continued until a prepolymer is formed having an inherent viscosity, expressed as deciliters per gram, of at least 0.1, and preferably from about 0.13 to 0.3, the inherent viscosity (I.V.) as used in the present specification and claims being determined from a solution of 0.4 grams of the polymer in 100 ml. of 97 percent $H_2SO_4$ at 25° C.

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350 to 425° C. The second stage reaction generally takes at least 0.5 hours, and preferably from about 1 to 4 hours or more.

In contrast to the prior art two-stage process wherein a reduced pressure (vacuum) was used in each of the reaction zones, the process of the present invention employs a pressure equal to at least atmospheric pressure, e.g., 1 to 2 atmospheres, and preferably atmospheric pressure. In order to use atmospheric pressure or higher, nitrogen gas must be continuously passed through each of the reaction zones during the respective polybenzimidazole polymerization reactions. The nitrogen is passed through the vapor space of the reaction zones in any convenient manner so as to remove volatile by-products such as phenol and water from the reaction zones as they are formed or evolved.

The nitrogen employed should be substantially oxygen free, i.e., contain less about 20 p.p.m. of oxygen, preferably less than about 8 p.p.m., and more preferably, be oxygen free. The nitrogen is introduced into the reaction zone at a rate of flow measured at standard conditions, that is, atmospheric pressure and temperature, in the range of from about 1 to 200 percent of the volume of the reaction zone per minute. The nitrogen gas can be passed into the polymerization reaction zone at room temperature or if desired, preheated to the reaction temperature.

As a result of using the continuous nitrogen flow and at least atmospheric pressure conditions in each reaction zone, the product polybenzimidazole polymer has a molecular weight, expressed as I.V., which is comparable to that obtained via the two-stage reduced pressure process, but contains less gels and insolubles. The lower gel and insoluble content decreases the extent of filtration involved in forming suitable spinning or casting solutions.

While the description of the above preferred embodiment has been in connection with a polymerization process conducted in two reaction zones, the invention, is equally applicable to a one-stage polybenzimidazle polymerization process, for example, where the foam is crushed or powdered as it forms or where the foam formation is inhibited or prevented as is well known to those skilled in the art. The reaction conditions for one-stage process are essentially the same as those employed in the two-stage process.

The invention is additionally illustrated in connection with the following example wherein the preferred polybenzimidazole polymer is used, namely, poly-2,2'-(m-phenylene)-5,5'-bibenzimidazole, the recurring unit of which is

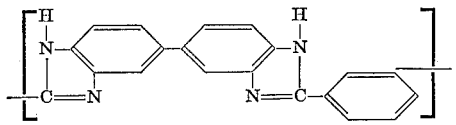

EXAMPLE

Stoichiometric quantities of pure 3,3'-diaminobenzidine (600 grams) and diphenylisophthalate (891 grams) are charged to a fifteen gallon, agitated hot oil heated stainless steel reactor. The reactor is freed of all air by purging several times with deoxygenated nitrogen followed by a constant flow of 2 standard cubic feet per hour of nitrogen through the reactor in which a pressure of about one atmosphere is maintained. The oil is preheated to 150° C. and heated to 290° C. in 40 to 50 minutes. At about 260° C., phenol and water are evolved. When the mass becomes exceedingly viscous, agitation is stopped and heating at 290° C. is continued for 90 minutes to conclude the first stage of the reaction.

The polymer from the first stage, which is in the form of a voluminous foam and has an inherent viscosity of 0.24, is pulverized and charged to a second, one gallon electrically heated agitated reactor. The vapor space of this reactor is likewise purged several times with deoxygenated nitrogen and a constant flow of about 1.0 standard cubic feed per hour of such nitrogen is maintained through the reactor during the entire second stage of the reaction, which is also carried out at about one atmosphere of pressure. The batch is gradually heated to 385° C. and kept at that temperature for three hours to conclude the second stage of the reaction.

The final poly-2,2'-(m-phenylene)-5,5'-bibenzimidazole is found to have an inherent viscosity of 0.89 and a plugging value of 0.35.

When the prior art two-stage reduced pressure process (less than about 0.7 mm. of Hg) is used, the resulting polymer has an inherent viscosity of 1.00 and a plugging value of 0.15. Normally, by using the process of the present invention the resulting polymer has a plugging value of 3 to 20 times or more as gerat as the plugging value of the polymer produced via the reduced pressure process.

The polymers of the present invention may be dissolved in a suitable solvent, e.g., dimethylacetamide, dimethylformamide, or dimethylsulfoxide, to form a spinning or casting solution which may be fabricated into filaments or films. After suitable post treatments such as drawing and heating, the filaments may be knitted or woven into fabrics having excellent high temperature properties and are useful in applications such as space suits, parachutes, and the like.

The principle, preferred embodiment, and mode of operation of the present invention have been described in the foregoing specification. However, it should be understood that the invention which is intended to be protected herein, may be practiced otherwise than as described without departing from the scope of the appended claims.

We claim:

1. In the process for the polymerization of aromatic polybenzimidazoles in a polymerization reaction zone maintained under substantially oxygen-free conditions and at a temperature above about 200° C., the improvement which comprises conducting the polymerization reaction at a pressure at least equal to atmospheric pressure while continuously passing nitrogen through the reaction zone.

2. The process of claim 1 wherein the aromatic polybenzimidazole obtained is poly-2,2'-(m-phenylene)-5,5'-bibenzimidazole, the pressure in the reaction zone is equal to atmospheric pressure, and the nitrogen is continuously passed through the vapor space of the reaction zone at a flow rate of from about 1 to 200 percent of the volume of the reaction zone per minute so as to remove volatile by-products as they are formed.

3. In the process for the polymerization of aromatic polybenzimidazoles wherein a first stage melt polymerization reaction is conducted in a reaction zone maintained at a temperature of above about 200° C. to yield a foamed prepolymer, which is thereafter subjected to a second stage solid state polymerization reaction in a reaction zone maintained at a temperature of above about 250° C. to yield the product aromatic polybenzimidazole, and wherein both reactions are conducted under substantially oxygen-free conditions, the improvement which comprises conducting both stages at a pressure at least equal to atmospheric pressure while maintaining a continuous flow of nitrogen through the reaction zones.

4. The process of claim 3 wherein the pressure in each zone is atmospheric and nitrogen is passed through the zones at a flow rate of from about 1 to 200 percent of the volume of the reaction zone per minute.

5. In the process for the polymerization of aromatic polybenzimidazoles wherein a first stage melt polymerization reaction is conducted in a reaction zone maintained at a temperature of above about 200° C. to yield a foamed prepolymer, which is thereafter subjected to a second stage solid state polymerization reaction in a reaction zone maintained at a temperature of above about 250° C. to yield the product aromatic polybenzimidazole, and wherein both reactions are conducted under substantially oxygen-free conditions, and further wherein volatile by-products are evolved and form in the vapor space above the polymerizing materials, the improvement which comprises conducting both stages at a pressure of from one to two atmospheres while continuously passing nitrogen through the vapor space of the reaction zones so as to remove the volatile by-products therefrom.

6. The process of claim 5 wherein the aromatic polybenzimidazole obtained is poly-2,2'-(m-phenylene)-5,5'-bibenzimidazole, the pressure in the reaction zones is equal to atmospheric pressure, and the nitrogen is continuously passed through the vapor space of the reaction zones at a flow rate of from about 1 to 200 percent of the volume of the reaction zone per minute so as to remove volatile by-products as they are formed.

7. The process of claim 6 wherein the temperature maintained in the first reaction zone is from about 270 to 300° C., and the resulting prepolymer has an inherent viscosity of at least 0.1, while the temperature maintained in the second reaction zone is from about 350 to 425° C. and the product polybenzimidazole has an inherent viscosity of at least 0.6.

References Cited
UNITED STATES PATENTS

| | | | |
|---|---|---|---|
| 3,174,947 | 3/1965 | Marvel et al. | 260—47 |
| 3,414,543 | 12/1968 | Paufler | 260—47 |

JOSEPH L. SCHOFER, Primary Examiner

J. KIGHT III, Assistant Examiner

U.S. Cl. X.R.

260—47, 78